Patented Oct. 21, 1952

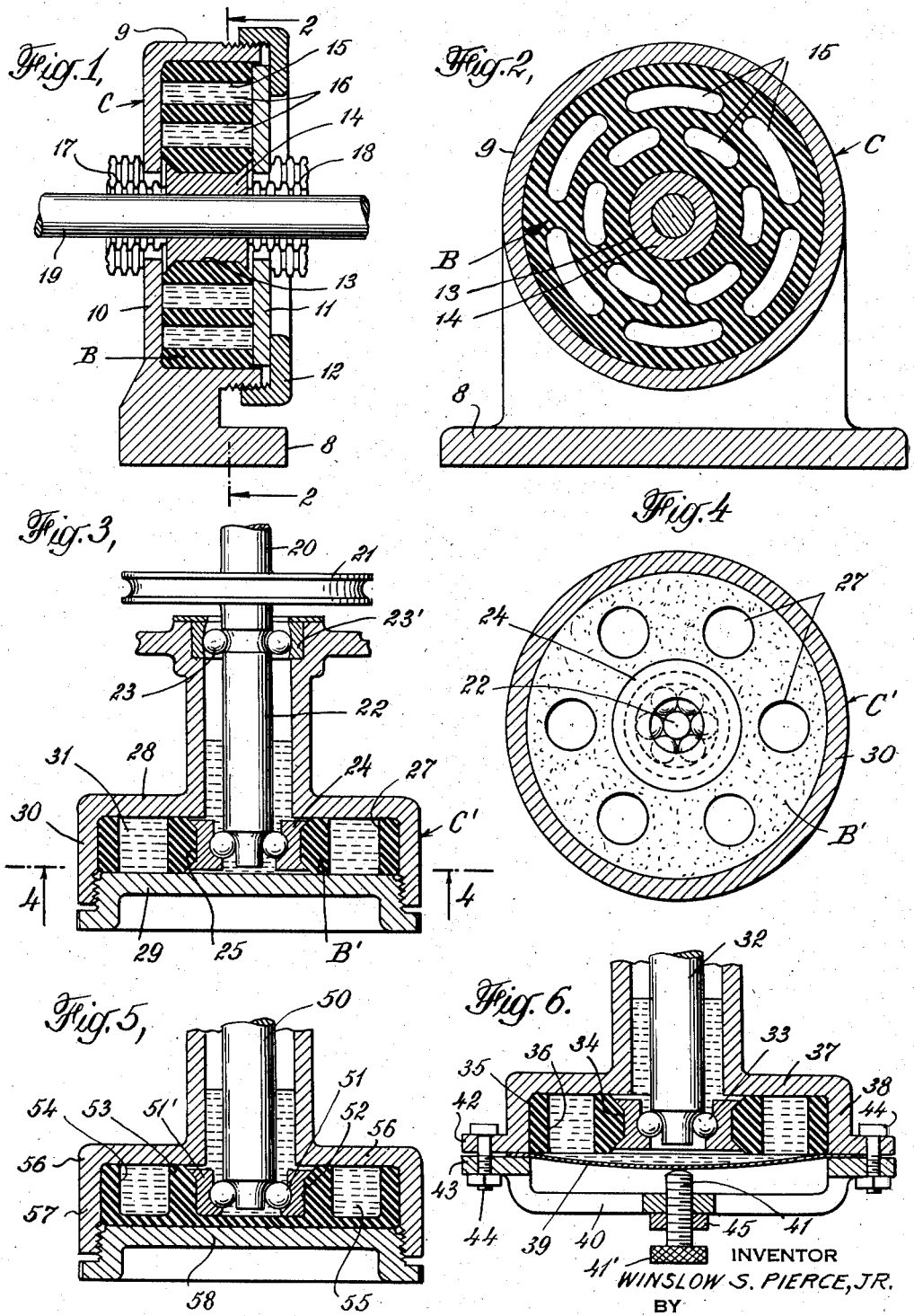

2,614,896

UNITED STATES PATENT OFFICE 2,614,896

ADJUSTABLE DAMPENING BEARING SUPPORT

Winslow S. Pierce, Jr., Keene, N. H.; Mary Brush Pierce, executrix of said Winslow S. Pierce, Jr., deceased, assignor to Mary Brush Pierce Application May 6, 1950, Serial No. 160,494

10 Claims. (Cl. 308—26)

This invention relates to bearings, and particularly to bearing structures incorporating supports which permit controlled movement of the bearing and damping of such movement which may be variably adjustable.

Many mechanical installations include shafts, spindles, or other rotary parts operating at high rotative speeds. The maximum practical speed of rotation of such parts is in many cases undesirably limited by the fact that accurate static and dynamic balance of the parts cannot be attained or maintained, with the result that destructive or at least harmful vibrations or oscillations are set up in the part, and more particularly in the bearing structure and its support. The unbalance may result from simple static eccentricity of the mass of the rotary part. This is true, for example, in the spindles of textile strand winding bobbins, where irregular winding of the strand or yarn distributes the mass eccentrically of the spindle axis. A similar situation exists in centrifuges where initial eccentric distribution or subsequent shifting of the load unbalances the mass with respect to the axis of the supporting shaft or spindle. Undesirable vibrations or oscillations may also occur due to the coincidence of the natural period of vibration of the element with the speed of a rotary element, or an appropriate harmonic thereof, or with an extraneous vibration such as one produced by the driving motor or other adjacent or associated apparatus.

All of such vibrations or oscillations are best corrected or minimized by devices permitting limited eccentric movement of the rotary element, and this for the reason that a rotary mass which is free to find its own axis of rotation does so in perfect balance, both statically and dynamically.

I have discovered that if bearings for rotary elements are so supported as to permit limited freedom of movement eccentrically of the bearing axis and if such movement is damped to a suitable degree, the undesirable oscillation or vibration of the element under varied conditions of speed, unbalance and extraneous vibration, can be effectively minimized or eliminated. I have devised an improved bearing structure incorporating a bearing support that is resiliently yieldable laterally of the bearing axis and that incorporates means for damping the eccentric oscillation or vibration of the bearing. My improved structure preferably includes means for adjustably varying the extent to which eccentric oscillation or vibration of the bearing is damped by the damping means.

In describing the invention in detail, reference will be made to the accompanying drawings, in which certain examples of bearings including my invention are illustrated.

In the drawings—

Fig. 1 is a sectional elevation of an embodiment of my invention applied to a line shaft bearing;

Fig. 2 is a sectional view taken along the line 2—2 of Fig. 1 and viewed in the direction of the arrows;

Fig. 3 is a sectional elevation of an embodiment of my invention applied to a thrust and radial bearing of a shaft or spindle;

Fig. 4 is a sectional view taken along the line 4—4 of Fig. 3 and viewed in the direction of the arrows;

Fig. 5 is a sectional elevation of a modified form of the bearing structure illustrated in Fig. 3; and Fig. 6 is a sectional elevation of a further modified form of my bearing structure.

Referring to Figs. 1 and 2, I have there illustrated an embodiment of the invention applied to a line shaft bearing of the type generally termed a pillow block. The disclosed embodiment includes a casing C having a supporting base 8, a circumferential wall 9 and an integral end wall 10. An opposite end wall 11 is movably secured to the casing by a flanged ring 12 threadedly engaging the outer circumferential surface of the wall 9.

A resilient block B is enclosed within the casing C. The block B may be disc-shaped as shown and has a central opening 13 extending therethrough in which is disposed and supported the shaft bearing 14, which may be a sleeve bearing, as shown, or a ball or roller bearing or any other known type of bearing. The block B is formed of resilient yieldable but substantially incompressible material, such as vulcanized natural or synthetic rubber. If natural rubber is employed, it is preferred to use a natural rubber that is so compounded in a known manner as to be resistant to the hydraulic fluid employed, which may be a hydrocarbon oil. Synthetic rubbers may be used, and the synthetic rubbers herein referred to which are resistant to hydrocarbon oils, are defined in Bureau of Standards circular C-427, last paragraph on page 3, and include ethylene polysulfide rubbers, known as "Thiokol," and those derived from butadiene, known under such trade names as "Hycar," "Ameripol," "Chemigum" and "Neoprene Type I." The word rubber as used herein includes all of the types of natural and synthetic rubbers here identified.

As best shown in Fig. 2, the block B is provided with a plurality of fluid pockets or openings 15 extending lengthwise of the bearing axis, and, in the disclosed embodiment, substantially parallel to the bearing openings 13. The pockets 15 are preferably distributed symmetrically about the bearing axis and may comprise two concentric circumferentially extending rows of spaced pockets staggered with respect to each other, as shown. The casing C is filled with a hydraulic fluid, such as oil 16, which fills the pockets 15 in the block B. The bearing 14 is movable laterally of its axis in the casing C upon resilient deformation of the block B, and the bearing may be sealed to the casing end walls 10 and 11 by flexible seals illustrated as metallic bellows-type members 17 and 18. The flanged ring 12 preferably makes a tight joint with both the casing walls 9 and 11 and it is screwed down to a degree such that a small leakage space for the hydraulic fluid is left between the opposite faces of the block B and the adjacent casing end walls 10 and 11. A shaft 19 is journalled in the bearing 14.

In operation, if, due to any cause, the shaft 19 is statically or dynamically unbalanced or for any other reason tends to vibrate or oscillate eccentrically of the axis, the yieldable resilient block B permits sufficient freedom of movement so that the shaft moves in a slightly eccentric path on an axis about which it is balanced, and harmful vibration of the bearing or its support is thereby avoided. This eccentric movement is damped by the hydraulic fluid 16 that yieldingly resists the alternate compression and expansion of the pockets 15 in the block B which result from eccentric movement of the shaft 19 and its bearing 14. The extent of this damping is variably adjustable by movement of the movable casing wall 11 relative to the opposite wall 10, which movement varies the cross-section of the fluid passages along opposite faces of the block B between the several fluid pockets 15. The end wall 11 is adjustably moved to accomplish this purpose by rotating the flanged ring 12 and so drawing it inward on or moving it outward along the circumferential wall 9 of the casing C. I have found that by this variable adjustment of the damping effect over a relatively small range while the shaft is rotating, a degree of damping can be imposed that eliminates harmful vibration of the bearing support and the supporting structure that carries it, whereby the shaft 19 can be rotated at higher speed than in known bearing structures without damage to the shaft, bearings or supporting structure.

My improved bearing structure may take various forms. In Figs. 3 and 4, I have illustrated the lower portion of a vertical shaft or spindle of the type used in winding textile strands or yarns on bobbins, the structure shown comprising a blade or stem 20 having a driving pulley 21 at its base and a shaft 22 below the pulley. The shaft 22 is supported in two spaced bearings, the upper bearing 23 comprising a ball bearing, the outer race 23' of which may be fixed, or may be mounted in the manner described in connection with the embodiment of Figs. 1 and 2 above. The lower thrust and radial bearing 24, also illustrated as a ball bearing, is mounted in the central opening 25 of a block or disc B' of natural or synthetic vulcanized rubber or other resilient yieldable material having spaced symmetrically disposed fluid pockets 27 extending therethrough from face to face thereof substantially parallel to the bearing axis. The block B' is enclosed in a cylindrical casing C' having an upper end wall 28 that overlies the upper ends of the pockets 27 and a lower end wall 29 in the form of a circular plug threadedly engaging the cylindrical wall 30 of the casing and overlying the lower ends of the pockets 27. A hydraulic fluid, such as oil 31, fills the casing C' and the pockets 27, and this oil may serve both as a damping fluid and a lubricant for the bearing 24. The operation of this embodiment is the same as has been described in connection with the embodiment of Figs. 1 and 2.

The resilient block of my improved bearing structure may be provided with fluid pockets that are closed at one end and so comprise cup-shaped openings in the block. Such a construction is shown in Fig. 5 in connection with a bearing of the general type shown in Figs. 3 and 4. Referring to Fig. 5, the shaft 50 is carried in a thrust and radial ball bearing 51, the outer race 51' of which is mounted in the central opening 52 of a rubber block or disc 53. Spaced fluid pockets 54 are provided in the block 53 around its central opening 52, and these pockets are preferably arranged symmetrically about the central opening in the manner described above in connection with Figs. 3 and 4. The pockets 54 extend substantially parallel to the central bearing opening. Each of the pockets 54, as well as the bearing opening 52, extend through one face of the block 53 to a point near but short of the opposite face thereof. With this arrangement, the hydraulic fluid, such as oil 55, flows between the several pockets 54 along one face of the block only, that is, the face into which the pockets 54 open, this being the upper face in the embodiment shown in Fig. 5. The block 53 is enclosed in a casing comprising an upper end wall 56 overlying the open ends of the pockets 54, a cylindrical wall 57 and an adjustably movable bottom wall in the form of a circular plug 58 threadedly engaging the cylindrical wall 57. Adjustable movement of the plug 58 inwardly and outwardly of the casing varies the cross-section of the passages between the upper face of the block 53 and the upper casing end wall 56, and so varies the magnitude of the damping of eccentric oscillations of the bearing.

The structure shown in Fig. 6 is somewhat similar to that shown in Figs. 3, 4 and 5 and described above. Referring to Fig. 6, the end of the shaft 32 is carried in a thrust and radial ball bearing 33 mounted in the central opening 34 of a rubber disc or block 35, which has fluid pockets 36 extending from one face to a point near the other face thereof and distributed symmetrically about the bearing axis. The casing for the block 35 has an upper end wall 37 overlying the upper face of the block and a circumferential wall 38 with a flange 42 at its lower edge. The lower end wall 39 of the casing comprises a disc of relatively thin gauge resilient metal sealed at its edge to the circumferential wall 38 by suitable means. As shown, a ring 43 is secured to the flange 42 by bolts 44 or other suitable means, and the edge of the wall disc 39 is tightly clamped between the flange 42 and the ring 43. The lower wall disc 39 is slightly dished outward of the casing and is resiliently biased by its form to assume this outwardly dished position and to return thereto after deformation inwardly of the casing. In this respect, the end wall 38 operates in the same manner as does the bottom wall of the familiar oil can, which may be pushed inward to reduce the volume of the can and when released again springs outward to an outwardly dished position. A cross piece 40, fixed to or integral with the ring 43, carries at its midpoint a threaded stud 41 having a knob 41' at its outer end. The inner end of the stud 41 centrally engages the outwardly dished resilient end wall disc 39. By turning the stud 41, the movable resilient casing end wall 39 may be moved inwardly or outwardly to any desired extent within a limited range, thereby decreasing or increasing the section of the hydraulic fluid passages that connect the several fluid pockets 36 in the resilient block 35, and thus increasing or decreasing the damping effect exerted by the flow of the oil 44, or other hydraulic fluid, between the several pockets 36 in the block 35. A lock nut 45 is provided on the stud 41 to secure the stud in its adjusted position.

I claim:

1. A bearing structure comprising a block of yieldable resilient material having a central opening therein, a bearing carried in said central opening, said block having a plurality of fluid pockets therein extending substantially parallel to and distributed about said bearing opening and opening into a face of said block, a casing carrying said block including a wall overlying and closely adjacent the openings of said fluid pockets and forming restricted fluid passages between said pockets and a hydraulic fluid filling said pockets and the restricted space between said overlying wall and the block face into which said pockets open.

2. A bearing structure comprising a block of yieldable resilient material having a central opening therein extending to at least one of two opposite faces thereof, a bearing carried in said opening, said block having a plurality of fluid pockets therein extending between opposite faces of said block substantially parallel to said bearing opening, a casing enclosing said block including opposite walls extending over and closely adjacent the opposite faces of said block and the opposite ends of said fluid pockets and forming with the block restricted fluid passages between said pockets, and a hydraulic fluid filling said casing and said fluid pockets of said block.

3. A bearing structure comprising a substantially circular disc-shaped rubber block having a central opening therein extending to at least one of two opposite circular faces thereof, a bearing carried in said opening, said block having a plurality of relatively spaced fluid pockets therein extending substantially parallel to said bearing opening and disposed substantially symmetrically with respect to said bearing opening, a casing enclosing said block and including a wall extending over and closely adjacent the ends of said fluid pockets and forming restricted fluid passages between said pockets, and a hydraulic fluid filling said casing and said fluid openings of said block.

4. A bearing structure comprising a bearing, a mass of rubber surrounding said bearing and having a plurality of pockets therein distributed about and extending lengthwise of the axis of said bearing, a supporting casing surrounding said mass of rubber and including a wall overlying and closely adjacent the ends of said pockets and forming restricted fluid passages between said pockets and adjustably movable toward and away from said pocket ends, and a hydraulic fluid filling said casing and said openings.

5. A bearing structure comprising a block of yieldable resilient material having a central opening therethrough extending between opposite faces thereof, a bearing carried in said opening, said block having a plurality of fluid pockets extending therethrough substantially parallel to said bearing opening, a casing supporting said block including opposite end walls extending over and closely adjacent the opposite ends of said fluid pockets and forming restricted fluid passages between said pockets, and a threaded connection between one of said casing end walls and said casing whereby the space between the opposite faces of said block and said casing end walls may be variably adjusted.

6. A bearing structure comprising a substantially circular disc-shaped rubber block having a central opening therethrough extending between opposite circular faces thereof, a bearing carried in said opening, said block having a plurality of relatively spaced fluid pockets extending therethrough substantially parallel to said bearing opening and disposed substantially symmetrically with respect to said bearing opening, a casing supporting said block including opposite end walls extending over and closely adjacent the opposite ends of said fluid pockets and forming restricted fluid passages between said pockets, and a threaded connection between one of said casing end walls and said casing whereby the space between the opposite faces of said block and said casing end walls may be variably adjusted.

7. A bearing structure comprising a block of rubber having a central bearing-receiving opening therethrough, a plurality of fluid pockets extending through said block substantially parallel to the bearing opening, a casing around said block and including opposite end walls disposed closely adjacent opposite faces of said block and overlying the ends of said fluid pockets and forming with the block restricted fluid passages between said pockets, one of said end walls being movable relative to the other, a screw-threaded connection for adjustably moving said movable end wall toward and away from the opposite end wall and thereby varying the space between said walls and said block, and a hydraulic fluid filling said casing and said fluid pockets of said block.

8. A bearing structure comprising a block of rubber having opposite end faces and a substantially central bearing opening therein extending substantially normal to such faces, a plurality of fluid pockets in said block extending from one face thereof substantially parallel to said bearing opening to a point adjacent but short of the opposite block face, said pockets being substantially symmetrically distributed about said bearing opening, a casing for supporting said block including a wall adjustably connected to said casing and movable toward and away from said block face to which said fluid pockets extend to form restricted fluid passages between said fluid pockets, and a hydraulic fluid filling said casing and said pockets.

9. A bearing structure comprising a block of rubber having a central bearing-receiving opening therein, a plurality of fluid pockets extending into said block substantially parallel to the bearing opening, a casing around said block and including a resiliently movable wall adjacent and closely overlying said fluid pockets and forming restricted fluid passages between said pockets, and an adjusting screw secured to said casing and engaging said resilient movable wall for moving the same toward and from said fluid pockets.

10. A bearing structure comprising a bearing, a mass of yieldable resilient material surrounding said bearing and having a plurality of openings therein distributed about said bearing, a supporting casing surrounding said mass and including a wall adjacent said mass and adjustably movable toward and away from said mass to vary the resistance to fluid flow between the mass openings, and a hydraulic fluid within said casing and said openings.

WINSLOW S. PIERCE, Jr.

REFERENCES CITED

The following references are of record in the file of this patent:

UNITED STATES PATENTS

| Number | Name | Date |
|---|---|---|
| 1,641,856 | Lloyd | Sept. 6, 1927 |
| 2,350,272 | Cobb | May 30, 1944 |